United States Patent [19]

Hansen

[11] Patent Number: 5,275,752
[45] Date of Patent: Jan. 4, 1994

[54] METHOD AND PRODUCT FOR INHIBITING CORROSION DUE TO CHLORIDES

[76] Inventor: Charles N. Hansen, 1448 S. 1700 East, Salt Lake City, Utah 84108-2602

[21] Appl. No.: 884,170

[22] Filed: May 18, 1992

[51] Int. Cl.$^5$ ................................................. C09K 3/18
[52] U.S. Cl. ..................................... 252/70; 562/555; 252/385
[58] Field of Search ............................ 252/70, 73, 74

[56] References Cited

U.S. PATENT DOCUMENTS

| | | | |
|---|---|---|---|
| 2,192,320 | 3/1940 | McCarthy | 252/70 |
| 3,108,075 | 10/1963 | Hearst | 252/70 |
| 4,698,173 | 10/1987 | Hansen | 252/70 |

OTHER PUBLICATIONS

Carbamic Acid and the Carbmates Commercial "Ammonium Carbonate" A Comp Thesis on Inorganic and Theoretical Chemistry J. W. Mellor vol. 2, 1927.

*Primary Examiner*—Paul Lieberman
*Assistant Examiner*—Necholus Ogden
*Attorney, Agent, or Firm*—Dowell & Dowell

[57] ABSTRACT

The corrosive effect of salt on reinforced concrete in roadways, overpasses, bridges and buildings is inhibited by the application of a composition which consists essentially of ammonium carbamate, or which consists essentially of ammonium carbamate combined with salt or calcium chloride, as a deicer.

13 Claims, No Drawings

METHOD AND PRODUCT FOR INHIBITING CORROSION DUE TO CHLORIDES

BACKGROUND OF THE INVENTION

1. Field of the Invention

This invention relates to compositions and the methods for using them for inhibiting corrosion of metal due to chlorides.

2. History of the Related Art

There has been a great need for a chemical which will, in the presence of chlorides, inhibit the corrosion of steel; and considerable research has gone into seeking such a chemical.

Steel is exposed to the chloride ion from several sources. Structures which are exposed to the environment of ocean air and water are seriously corroded by the chlorides present. When calcium chloride is used as a heat exchange solution in refrigeration plants, corrosion inhibitors are added to inhibit the corroding effect of the chlorides. In order to accelerate the setting of concrete, calcium chloride has for years been added to the concrete and sad experience has taught that the contained chlorides will corrode the reinforcing steel in the concrete. Probably the most perplexing source of chloride corrosion has come from deicing the paved surfaces of the roads and highways. The chloride solutions thus produced are splashed onto the steel in the highway structures as well as onto the vehicles which travel the roads. The corrosion thus produced is quite visible on rusted structures and vehicle bodies. Also visible are the pot holes which are produced as the corrosion, produced by chlorides on reinforcing steel, expands, puts a stress on the concrete and breaks out large pieces of concrete. Repairing this damage and that to ocean front buildings is a major expense.

As an illustration of the research which has been done to inhibit the corrosion of steel and to protect the steel from the effects of chlorides, refer to "Corrosion of Reinforcing Bars In Concrete" by Mozer, Bianchini and Kesler, from the JOURNAL OF THE AMERICAN CONCRETE INSTITUTE, August 1965. The PORTLAND CEMENT ASSOCIATION, in 1968 put out a publication titled, "Concrete Information". Also in 1968, the PORTLAND CEMENT ASSOCIATION put out a publication "Corrosion of Steel in Concrete" by John G. Hendrickson. The AMERICAN CONCRETE INSTITUTE put out a publication titled, "Corrosion of Reinforcing Steel", by Bailey Tremper. In addition, these publications list dozens of additional publications on the same subject.

Many attempts have been made to find inhibitors which would prevent the corrosion of steel. Gouda and Monfore, in a publication titled, "A Rapid Method for Studying Corrosion Inhibition of Steel in Concrete" discuss trying some of the well-known corrosion inhibitors, such as sodium nitrite, potassium chromate and sodium benzoate. In order to inhibit the corrosion effects of a 2% addition of calcium chloride to concrete, they found that it requires the addition of 1% to 2% of sodium nitrite and 2% to 4% of potassium chromate. Because sodium benzoate is precipitated by calcium chloride they tested sodium benzoate against 1.6% of sodium chloride and found that it took 4% to 6% of sodium benzoate to inhibit the corrosion from this amount of sodium chloride.

Because of their side effects, most inhibitors involve problems. As an example, the chromates, and there are other effective chromate salts, are highly toxic. If they contact the skin they may produce ulcers. In a Portland Cement Association publication of 1968 CONCRETE INFORMATION, "Effect of Various Substances on Concrete and Protective Treatments, Where Required", indicates the publication that sodium nitrite will cause slow disintegration of concrete. To date, a satisfactory corrosion inhibitor for chlorides has not been found.

The above inhibitors are anodic inhibitors. They can form, according to Gouda and Monfore, "sparingly soluble iron salts or gamma $Fe_2O_3$ films on the anodic areas, thus preventing ferrous ion from passing through into solution." These salts are formed, in conjunction with the classic understanding, where the corrosion of steel is considered to be electrochemical. At the anode, the iron goes into solution, forms a ferrous ion and releases two electrons. $Fe \rightarrow Fe{+}{+}{+}2e{-}$. At the cathode the two electrons react with two hydrogen ions $2H{+}{+}2e{+}\rightarrow H_2$ to form a hydrogen film. When the supply of oxygen is limited and the pH is relatively high, an anodic film builds up on the steel to stop the corrosion. When chloride ions are present, the protective anodic films are removed by forming soluble chloride compounds and the steel is left open to further electrochemical attack.

SUMMARY OF THE INVENTION

In 1976 the Environmental Protection Agency estimated that the use of salts, sodium or calcium chloride, as deicing compounds costs about five billion dollars per year. Probably a good part of this cost is due to the corrosion, which the contained chlorides produces on steel. In spite of the damage which salt has produced, it has over the years proved to be a good deicing chemical and has undoubtedly saved thousands of lives and injuries which would otherwise have resulted from slick and icy roads, and it is fitting to recognize the good qualities of salt as a deicer. In the first place, salt is the least expensive of all the available deicing chemicals. Next, the ions of salt are smaller than the ions of the other two deicing chemicals which do not attack concrete itself, that is, calcium chloride or urea. These smaller ions melt more ice per unit of weight and since the smaller ions are more mobile, they move faster from the concentrated portions of the brine to the less concentrated surface of the ice and at the same temperature, salt melts the ice faster.

This invention makes it possible to retain the good features of salt, that is, its low unit cost, its melting ice faster, its melting more ice per unit of weight and, simultaneously, to neutralize or inhibit the salt's undesirable characteristic of corroding steel. When combined with ammonium carbamate these desirable properties are retained.

When one considers the work and expense connected with the work of replacing the steel in the various steel structures which have been corroded with salt and then observes the expense connected with removing the concrete which surrounds the reinforcing steel and then replacing that steel with epoxy coated steel, the potential value of my invention may be understood. Each major highway structure so repaired may cost millions of dollars. This invention makes it possible to avoid this expense by treating the steel with ammonium carbamate with or without salt, or with solutions of ammonium carbamate with or without salt. Further, the process of using these compositions as deicers may in and of itself inhibit and stop the corrosion of the steel found in highway structures.

These compositions may also be used in stopping the corrosion in various structures which have begun to corrode under the influence of salt from the ocean or other bodies of salt water.

DETAILED DESCRIPTION OF THE INVENTION

An important part of the invention is the discovery of a composition that inhibits the corrosion started by chloride based deicers. The use of such a composition will, in many cases, eliminate the high cost of mechanically removing the steel from these structures and replacing it with expensive epoxy coated steel in order to stop and avoid the effects of the corrosion that is already occurring.

This invention relates to the use of various deicing compositions which contain ammonium carbamate and which may be combined with salt or calcium chloride. My tests show that when corroding steel is exposed to ammonium carbamate or to combinations of ammonium carbamate and salt, the corrosion is stopped.

Because of the corrosion inhibiting characteristics of ammonium carbamate, it is now possible to formulate compositions which do not corrode steel and which retain the desirable deicing properties of salt, that is lower cost, faster action, and more efficient melting characteristics.

TESTING PROCEDURES

This invention relates to the use of various compositions which contain ammonium carbamate combined with salt or calcium chloride. In order to show that these deicing compositions, which contain ammonium carbamate, combined with salt or calcium chloride, fulfill these conditions, a series of tests were made.

The D15C series of tests were run in duplicate and show the corroding effect that a 3% solution of salt or calcium chloride has on mild steel, and the non-corroding effect that a 3% solution of various compositions of ammonium carbamate combined with salt or calcium chloride has on mild steel. The composition of the deicer was varied from 0% of ammonium carbamate to 100% of an ammonium carbamate deicer and from 100% to 0% salt and 100% to 0% calcium chloride.

The D22C series of tests were run in duplicate to show how the addition of ammonium carbamate or of combinations of ammonium carbamate and salt stops the corrosion of steel which has been corroded by a sodium chloride solution.

EXAMPLE NO. 1

These series of tests were run by preparing pieces of 16 gage mild steel which were one inch square. The pieces were prepared for testing by removing the mill scale with an inhibited muriatic acid and then by grinding off the edges and corners of the pieces with a fine emery wheel. Each test piece was then marked with an electric engraver to identify the test piece. Both sides of the test piece were then polished, with fine emery paper, to a bright surface. The dust was then removed from the test pieces with a paper towel before washing the surface with a 1-1-1 trichloroethane solvent.

The test pieces were then weighed on a Mettler H10 Balance to the closest tenth of a milligram and found to vary in weight from 6.4273 to 7.1312 grams. The balance is viewed as accurate to within 0.0003 grams. After weighing, each test piece was immersed into 60 grams of the solution to be tested.

The solution being tested was contained in polystyrene vials which were about 50 mm in diameter and 85 mm high with a snap on cap. During the test the solutions and test pieces were kept at a constant temperature, 96 degrees F., in a Labline Constant Temperature water bath.

The solutions were made from ammonium carbamate from a urea production plant which had been crystallized and were analyzed to have the following composition: Ammonium carbamate, 97.5%; Urea, 0.3%; and Water, 2.2%. In commercial usage, the ratio of salt to the ammonium carbamate may be adjusted according to the percentage of ammonium carbamate in the crystals or product being used.

At the end of the three day corrosion period, each test piece was removed from the respective test solution. The corrosion residue was cleaned from the edges and corners and each test piece was brushed 80 times on both sides with a stiff plastic brush. The pieces were then dried with a paper towel, washed with 1-1-1 trichloroethane, dried and weighed.

Following is a table describing the test solutions used and the results of the tests:

| TEST NO. | GRAMS NaCl | GRAMS $NH_4COONH_2$ CRYSTALS | GRAMS $H_2O$ | GRAMS LOST | % OF CORROSION SAVED | REMARKS |
|---|---|---|---|---|---|---|
| D15C1-AV | 1.8 | 0.0 | 58.2 | 0.0122 | 0 | YELLOW PRECIPITATE + BLACK DEPOSIT ON TEST PIECE |
| D15C2-AW | 0.45 | 1.35 | 58.2 | 0.0000 | 100 | NO VISIBLE CORROSION |
| D15C3-AX | 0.45 | 1.35 | 58.2 | (2) (0.0001) | 100 | NO VISIBLE CORROSION |
| D15C4-AY | 0.675 | 1.125 | 58.2 | 0.0000 | 100 | NO VISIBLE CORROSION |
| D15C5-AZ | 0.675 | 1.125 | 58.2 | (2) (0.0001) | 100 | NO VISIBLE CORROSION |
| D15C6-BA | 0.77 | 1.03 | 58.2 | 0.0001 | 100 | NO VISIBLE CORROSION |
| D15C7-BC | 0.77 | 0.13 | 58.2 | 0.0000 | 100 | NO VISIBLE CORROSION |
| D15C8-BD | 0.90 | 0.90 | 58.2 | 0.0008 | 93 | CORROSION ON SMALL CORNER OF TEST PIECE |

-continued

D15C SERIES OF TESTS

| TEST NO. | GRAMS NaCl | GRAMS NH$_4$COONH$_2$ CRYSTALS | GRAMS H$_2$O | GRAMS LOST | % OF CORROSION SAVED | REMARKS |
|---|---|---|---|---|---|---|
| D15C9-BE | 0.90 | 0.90 | 58.2 | 0.0015 | 88 | CORROSION ON EDGE OF TEST PIECE |
| D15C10-BF | 0.0 | 1.8 | 58.2 | 0.0000 | 100 | NO VISIBLE CORROSION |
|  | GRAMS CaCl$_2$ |  |  |  |  |  |
| D15C13-BI | 1.8 | 0.0 | 58.2 | 0.0131 | 0 | YELLOW PRECIPITATE + BLACK DEPOSIT ON TEST PIECE |
| (1) D15C14-BJ | 0.45 | 1.35 | 58.2 | 0.0000 | 100 | NO VISIBLE CORROSION |
| (1) D15C15-BK | 0.45 | 1.35 | 58.2 | 0.0000 | 100 | NO VISIBLE CORROSION |

(1) In earlier tests and in this test, when calcium chloride and ammonium carbamate were combined in a solution, a white precipitate was formed. Without knowing the chemistry of the reaction, it appears likely that the precipitate was calcium carbamate or at least the carbamate was being removed from the solution and that when the ratio of calcium chloride to ammonium carbamate was higher than about 1:3, there was not sufficient ammonium carbamate left in solution to prevent the corrosion of the test piece.
(2) The apparent slight increase in weight is within the limits of accuracy of the test.

These tests show that if a deicer is composed of ammonium carbamate and salt, and if it contains more than about, (1.03×0.976)/1.8=55.8% ammonium carbamate, the deicer will not corrode steel. Further, if the deicer contains (0.9×0.975)/1.8=48.8% ammonium carbamate, an average of about 90% of the corrosion produced by plain salt will be saved, and as the percentage of salt in the deicer composition is increased to 100%, the percentage of corrosion saved will be reduced to 0%. The tests also show that if a deicer is made of ammonium carbamate and calcium chloride, the deicer will not corrode steel up to a ratio of 3 parts of ammonium carbamate to 1 part of calcium chloride.

EXAMPLE NO. 2

These series of tests were run by preparing the test pieces in the same manner as in Example No. 1.

After weighing the test pieces, they were each placed into 60 grams of a 3% sodium chloride solution. The test pieces and solutions were kept, for three days, in the polystyrene vials at 96 degrees F. as explained in Example No. 1. The condition of each test piece was noted and the test pieces were then removed from the salt solutions, brushed, washed with solvent, dried, weighed and the weights were recorded.

After three days in the constant temperature bath, the test pieces lost, because of corrosion, from 6.3 to 8.0 milligrams of weight.

The test pieces were then placed in duplicate, 60 gram solutions of distilled water plus 3% water solutions of salt, ammonium carbamate, and various combinations of salt and ammonium carbamate.

These solutions were kept at 96 degrees F. for another three days. The corrosion or lack of corrosion was noted on each test piece and the test pieces were then brushed, washed with solvent, weighed and the weights were recorded.

In deciding the composition of the solutions to be used in order to determine whether or not ammonium carbamate would stop the corrosion, which a salt solution had already started, it was concluded that it would be necessary to add salt to the solutions. With salt present in the solutions, it should approximate the condition in which salt would be corroding the steel before the ammonium carbamate was added. It was decided that solutions of salt and ammonium carbamate, which in the D15C Series of tests did not corrode steel, would be the logical solutions to use in this test.

Following is a table showing the results of the test:

D22C SERIES OF TESTS

| TEST NO. | GRAMS LOST IN 3% SALT SOLUTION | SOLUTION INTO WHICH CORRODING TEST PIECE WAS PLACED | | | GRAMS LOST | % OF CORROSION SAVED | REMARKS |
|---|---|---|---|---|---|---|---|
| | | % SALT | % NH$_4$COONH$_2$ CRYSTALS | % DISTILLED WATER | | | |
| D22C1-BL | 0.0080 | 3.0 | 0.0 | 97 | 0.0085 | 0.0 | YELLOW PPT. PRODUCED |
| D22C2-BM | 0.0077 | 3.0 | 0.0 | 97 | 0.0090 | 0.0 | YELLOW PPT. PRODUCED |
| D22C3-BN | 0.0077 | 0.0 | 3.0 | 97 | 0.0000 | 100 | NO VISIBLE NEW CORROSION |
| D22C4-BO | 0.0073 | 0.0 | 3.0 | 97 | (1) (0.0003) | 100 | NO VISIBLE NEW CORROSION |
| D22C5-BP | 0.0073 | 0.0 | 0.0 | 100 | 0.0089 | 0.0 | YELLOW PPT. PRODUCED |
| D22C6-BQ | 0.0074 | 0.0 | 0.0 | 100 | 0.0084 | 0.0 | YELLOW PPT. PRODUCED |
| D22C7-BR | 0.0073 | 0.75 | 2.25 | 97 | 0.0000 | 100 | NO VISIBLE NEW CORROSION |

-continued

D22C SERIES OF TESTS

| TEST NO. | GRAMS LOST IN 3% SALT SOLUTION | SOLUTION INTO WHICH CORRODING TEST PIECE WAS PLACED | | | GRAMS LOST | % OF CORROSION SAVED | REMARKS |
|---|---|---|---|---|---|---|---|
| | | % SALT | % $NH_4COONH_2$ CRYSTALS | % DISTILLED WATER | | | |
| D22C8-BS | 0.0065 | 0.75 | 2.25 | 97 | (1) (0.0001) | 100 | NO VISIBLE NEW CORROSION |
| D22C9-BT | 0.0077 | 1.125 | 1.875 | 97 | 0.0000 | 100 | NO VISIBLE NEW CORROSION |
| D22C10-BU | 0.0071 | 1.125 | 1.875 | 97 | (1) 0.0002 | 100 | NO VISIBLE NEW CORROSION |
| D22C11-BV | 0.0072 | 1.285 | 1.715 | 97 | (1) 0.0004 | 100 | NO VISIBLE NEW CORROSION |
| D22C12-BW | 0.0063 | 1.285 | 1.715 | 97 | (1) 0.0002 | 100 | NO VISIBLE NEW CORROSION |

(1) The apparent slight increase in weight is within the limits of accuracy of the test.

In viewing the results of this test, it is interesting to note that the test pieces in the vials containing distilled water continued the corrosion which the sodium chloride solution had started and that the corrosion rate was as high in the distilled water solution as it was in the 3% salt solution. Further, it was surprising to see that even the lowest concentrations of ammonium carbamate, along with the salt in solution, stopped the corrosion which the salt had already started.

These D22C series tests confirm, as do the prior tests, that approximately 55.8% ammonium carbamate in solution with salt, not only does not corrode steel, but further that it inhibits further corrosion that has already begun.

I claim:

1. A method of deicing metal reinforced structure, comprising applying to the structure a composition consisting essentially of ammonium carbamate and sodium chloride in which the ammonium carbamate is approximately 50% or more of the composition by weight.

2. The method of claim 1, in which the composition is in granular form.

3. A method of deicing metal reinforced structure, comprising applying to the structure a water solution of ammonium carbamate and sodium chloride in which the ammonium carbamate and sodium chloride comprise approximately 50% of the composition by weight.

4. A method of inhibiting corrosion of metal comprising applying a composition thereto consisting essentially of ammonium carbamate.

5. The method of claim 4, in which the ammonium carbamate is in granular form.

6. The method of claim 4, in which the ammonium carbamate is in a water solution.

7. A deicer corrosion inhibitor consisting essentially of ammonium carbamate and sodium chloride in which the ammonium carbamate is approximately 50% by weight.

8. A deicer corrosion inhibitor of claim 7, in which the ammonium carbamate and sodium chloride are in a water solution.

9. A method of deicing metal or reinforced structure comprising applying thereto a composition consisting essentially of ammonium carbamate and calcium chloride in which the ammonium carbamate is approximately 3 times the weight of the calcium chloride.

10. The method of deicing metal or reinforced structure as in claim 9, in which the composition is in a water solution.

11. A method of inhibiting the corrosive tendency of sodium chloride on metal by combining said sodium chloride with approximately an equal weight of ammonium carbamate.

12. A method of inhibiting the corrosive tendency of calcium chloride on metal by combining said calcium chloride with approximately an equal weight of ammonium carbamate.

13. A method of inhibiting corrosion of metal comprising applying a composition to said metal consisting essentially of ammonium carbamate and a chloride selected from a group of chlorides consisting of sodium chloride and calcium chloride.

* * * * *